(12) United States Patent
Kim

(10) Patent No.: US 8,032,288 B2
(45) Date of Patent: Oct. 4, 2011

(54) UPSHIFT CONTROL SYSTEM OF AN AUTOMATIC TRANSMISSION AND METHOD THEREOF

(75) Inventor: Hoegab Kim, Seoul (KR)

(73) Assignee: Hyundai Motor Company, Seoul (KR)

( * ) Notice: Subject to any disclaimer, the term of this patent is extended or adjusted under 35 U.S.C. 154(b) by 973 days.

(21) Appl. No.: 11/949,141

(22) Filed: Dec. 3, 2007

(65) Prior Publication Data
US 2009/0012681 A1 Jan. 8, 2009

(30) Foreign Application Priority Data

Jul. 6, 2007 (KR) .................. 10-2007-0068142

(51) Int. Cl.
*G06F 7/00* (2006.01)
*F16H 61/26* (2006.01)
(52) U.S. Cl. ............... 701/55; 701/51; 701/59; 701/65; 477/117; 477/156; 192/3.57
(58) Field of Classification Search ............ 701/65, 701/53, 64
See application file for complete search history.

(56) References Cited

U.S. PATENT DOCUMENTS

| | | | | |
|---|---|---|---|---|
| 4,754,403 A | * | 6/1988 | Hiramatsu | .............. 701/66 |
| 5,779,594 A | * | 7/1998 | Minowa et al. | ............ 477/156 |
| 6,149,547 A | * | 11/2000 | Oba et al. | ................ 477/154 |
| 6,584,394 B2 | * | 6/2003 | Takatori et al. | ............... 701/55 |
| 6,893,379 B2 | * | 5/2005 | Sakamoto et al. | .......... 477/156 |
| 6,962,552 B2 | * | 11/2005 | Sakamoto et al. | .......... 477/155 |
| 7,274,983 B1 | * | 9/2007 | Kim | ............................ 701/55 |
| 2002/0025883 A1 | * | 2/2002 | Kimura et al. | ............. 477/117 |
| 2006/0135316 A1 | * | 6/2006 | Fujii et al. | .................. 477/156 |

FOREIGN PATENT DOCUMENTS

KR 10-1998-0045829 9/1998

* cited by examiner

*Primary Examiner* — Thomas Black
*Assistant Examiner* — Lin B Olsen
(74) *Attorney, Agent, or Firm* — Morgan, Lewis & Bockius LLP

(57) ABSTRACT

An upshift control system and method of an automatic transmission. The system includes a vehicle speed detector outputting a vehicle speed signal; a transmission control unit for receiving the signal, calculating a target hydraulic pressure based on a change of the vehicle speed, and outputting a control signal corresponding to the target hydraulic pressure; and an actuator for controlling an actual hydraulic pressure of an on-coming element based on the control signal. The method includes determining whether a vehicle speed changes during an upshift; calculating the change of the vehicle speed; calculating a target hydraulic pressure based on the change of the vehicle speed; and controlling an actual hydraulic pressure of an on-coming element based on the target hydraulic pressure. The target hydraulic pressure may be calculated by adding a modified hydraulic pressure, proportional to the rate of change of the vehicle speed, to a constant reference hydraulic pressure.

7 Claims, 6 Drawing Sheets

UPSHIFT CONTROL SYSTEM OF AN AUTOMATIC TRANSMISSION AND METHOD THEREOF

CROSS-REFERENCE TO RELATED APPLICATION

This application claims priority to, and the benefit of, Korean Patent Application No. 10-2007-0068142, filed in the Korean Intellectual Property Office on Jul. 6, 2007, the entire contents of which are incorporated herein by reference.

BACKGROUND OF THE INVENTION (a) Field of the Invention

The present invention relates to an upshift control system and method of an automatic transmission that control hydraulic pressure of an on-coming element based on a change of vehicle speed during upshift.

(b) Description of the Related Art

An automatic transmission changes gears based on inputs such as vehicle speed and throttle opening. During shifting, an off-going element is released and an on-coming element is engaged by controlling hydraulic pressure supplied to the elements. The hydraulic pressure is controlled by solenoid valves.

Generally, hydraulic pressure of the off-going element is reduced while hydraulic pressure of the on-coming element is increased enough to endure the new speed ratio. This method uses a one-way clutch. However, since torque generated by change of engine inertia is reduced during shifting, shift shock may occur.

The above information disclosed in this Background section is only for enhancement of understanding of the background of the invention and therefore it may contain information that does not form the prior art that is already known in this country to a person of ordinary skill in the art.

SUMMARY OF THE INVENTION

An upshift control system of an automatic transmission includes a vehicle speed detector outputting a vehicle speed signal; a transmission control unit for receiving the signal, calculating a target hydraulic pressure based on a change of the vehicle speed, and outputting a control signal corresponding to the target hydraulic pressure; and an actuator for controlling an actual hydraulic pressure of an on-coming element based on the control signal.

The target hydraulic pressure may be calculated by adding a modified hydraulic pressure, proportional to the rate of change of the vehicle speed, to a constant reference hydraulic pressure.

An upshift control method of an automatic transmission includes determining whether a vehicle speed changes during an upshift; calculating the change of the vehicle speed; calculating a target hydraulic pressure based on the change of the vehicle speed; and controlling an actual hydraulic pressure of an on-coming element based on the target hydraulic pressure.

The target hydraulic pressure may be calculated by adding a modified hydraulic pressure that is proportional to a rate of change of the vehicle speed to a constant reference hydraulic pressure.

The actual hydraulic pressure may be controlled according to the reference hydraulic pressure if the vehicle speed does not change.

DETAILED DESCRIPTION OF PREFERRED EMBODIMENTS

Figure 1:
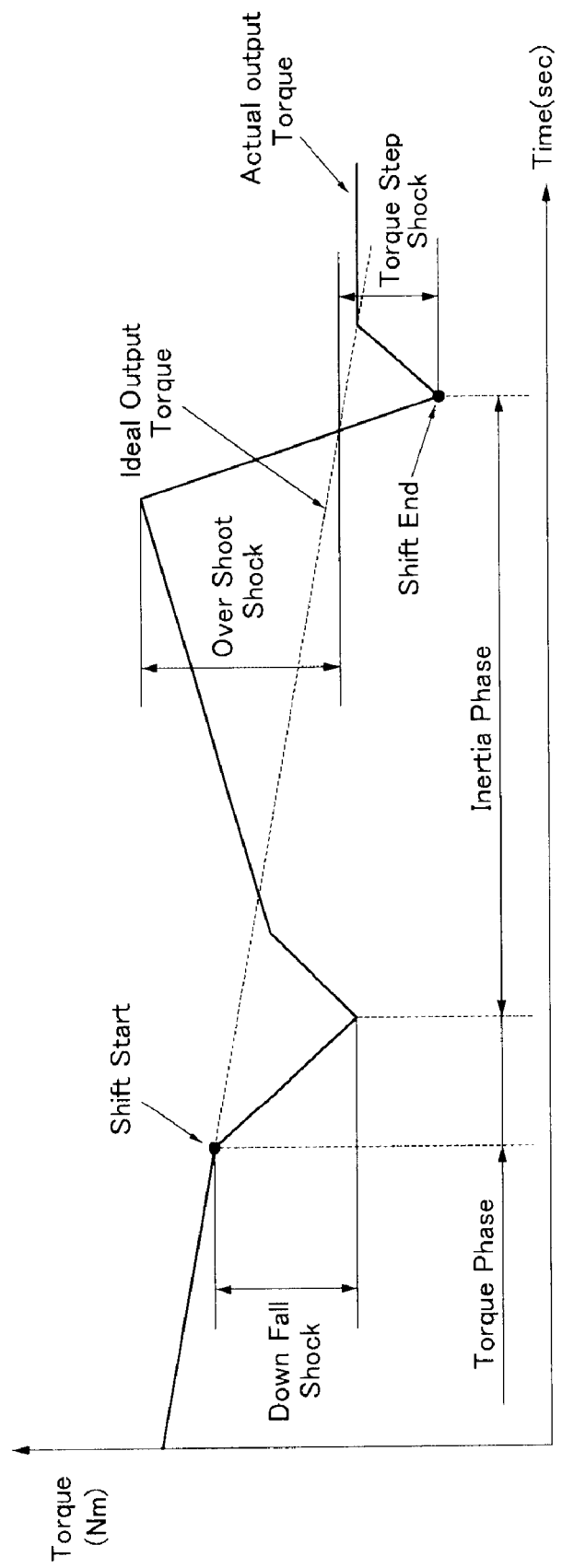
FIG. 1 is a graph showing actual torque and ideal torque with a passage of time in an upshift according to the prior art.

FIG. 1 is a graph showing actual torque and ideal torque according to the prior art with a lapse of time in an upshift.

As shown in FIG. 1, when a shift begins, hydraulic pressure of an off-going element is reduced in a state in which hydraulic pressure of an on-coming element is not sufficiently increased. Thus, output torque is quickly reduced. Reduction of the output torque generated at this stage is called downfall shock. After that, the engine speed is reduced and engine inertia is also reduced. Thus, torque is reduced according to the reduction of engine inertia. Accordingly, the output torque increases, and the increase of the output torque generated at this stage is called overshoot shock. A release of the off-going element is completed when engagement of the on-coming element is not completed at a finishing stage of shifting, and thus the output torque is quickly reduced. The reduction of the output torque generated at this stage is called torque step shock. After that, the output torque is the ideal torque of the new speed.

As described above, the engine inertia is reduced by reduction of the engine speed, and torque generated by the change of the engine inertia is also reduced. Thus, torque reduction generated by the change of the engine inertia increases driving torque or generates shift shock instantaneously. Similarly, shift shock also occurs at an inertia phase (refer to FIG. 1), which is a final stage of shifting when torque generated by a change of vehicle inertia changes according to a change of an incline of a road during the upshift.

More concretely, an additional torque $\tau_i$ generated by reduction of the engine speed is $$\tau_1 = I_c \frac{\omega}{\Delta t_1},$$
} where $I_e$ denotes the engine inertia, $\omega$ denotes the engine speed, and $\Delta t_1$ denotes a time during which the engine speed changes.

For example, if $I_e$ is 0.16 N·m·sec², $\omega$ is 104.7 rad/sec, and $\Delta t_1$ is 0.5 sec, the additional torque $\tau_i$ is 33.504 N·m. Therefore, shift shock may occur by the additional torque of 33.5 N·m.

Further, the conventional method utilizes engine torque reduction (ETR) control performed by a transmission control unit (TCU) and an engine control unit (ECU) to reduce shift shock generated by the additional torque.

The engine torque reduction control reduces shift time and maximum input torque as a consequence of forcibly reducing the engine torque during upshifting so as to reduce the additional torque generated by reduction of the engine speed. The additional torque can be reduced by reduction of the engine speed, but shift shock may not be reduced since additional torque is generated by the change of the vehicle inertia.

Similar to shift shock generated by the change of the engine inertia, the additional torque is generated in a case of change of output shaft inertia. That is, a negative additional torque or a positive additional torque occurs in a case of change of vehicle speed during shifting, and such additional torque is also a cause of shift shock.

Figure 2:
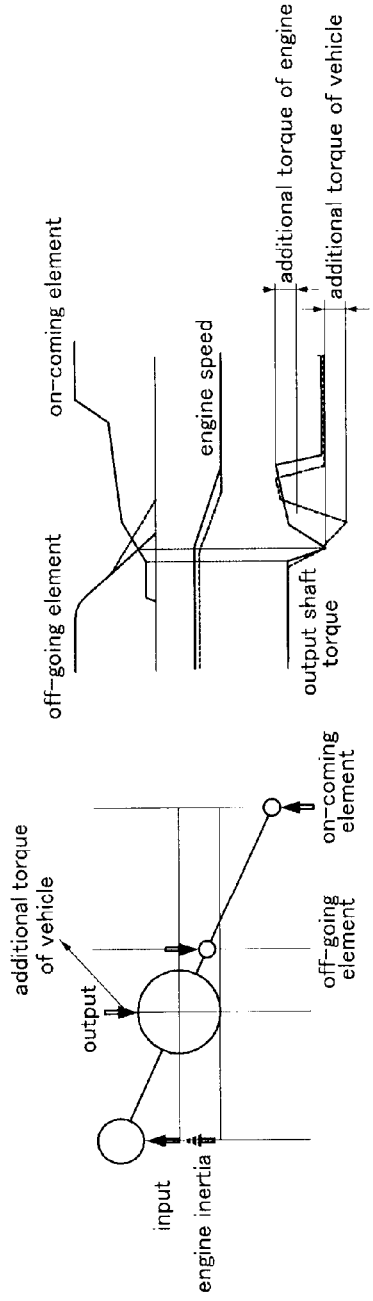
FIG. 2 is a control diagram showing an occurrence of additional torque when an upshift is performed while a vehicle runs uphill according to the prior art.
Figure 3:
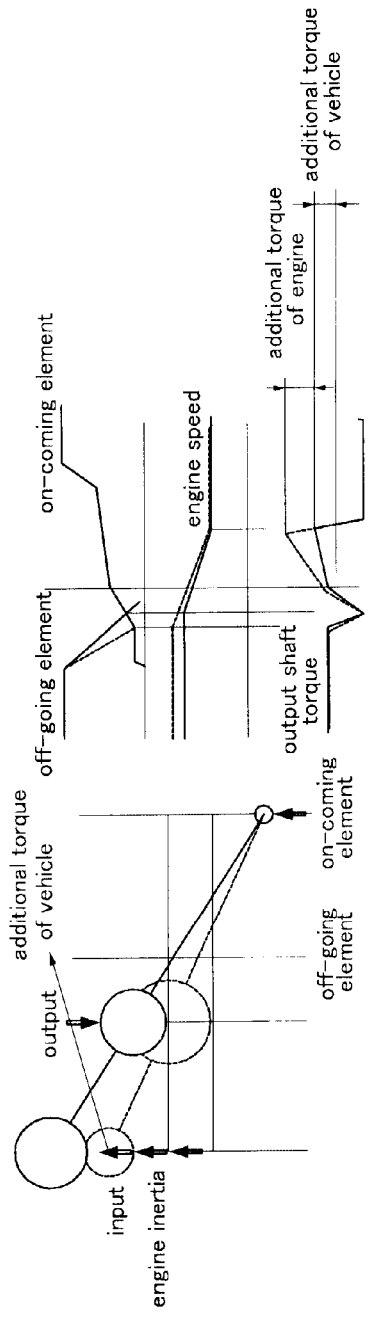
FIG. 3 is a control diagram showing an occurrence of additional torque when an upshift is performed while a vehicle runs downhill according to the prior art.

Referring to FIG. 2 and FIG. 3, generation of additional torque by change of vehicle inertia will be described in detail.

FIG. 2 is a control diagram showing an occurrence of additional torque when upshift is performed while a vehicle runs on an uphill road, and FIG. 3 is a control diagram showing an occurrence of additional torque when upshift is performed while a vehicle runs on a downhill road, both according to the prior art.

As shown in FIG. 2, when upshift is performed while a vehicle runs uphill, torque generated by the vehicle inertia is reduced by a resisting force of the hill, and thus negative additional torque that is a cause of shift shock may be generated. Therefore, when the vehicle runs uphill, the total additional torque $\tau_{t,i}$ (the additional torque $\tau_i$ generated by the change of the engine inertia plus the additional torque $\tau_{v,i}$ generated by the change of the vehicle inertia) is generated, and the additional torque $\tau_{v,i}$ is $$\tau_{v,i} = I_v \frac{\Delta v}{\Delta t_2},$$

where $I_v$ denotes the vehicle inertia, $\Delta v$ denotes a change of the vehicle speed, and $\Delta t_2$ denotes time during which the vehicle speed changes.

In the graph of FIG. 2, the solid line shows hydraulic pressure of friction elements, engine speed, and output torque when torque and the vehicle inertia do not change, and the dotted line shows hydraulic pressure of friction elements, engine speed, and output torque when torque and the vehicle inertia changes because of the upward inclination of the road.

In the example of FIG. 2, if the vehicle runs uphill and the vehicle speed is reduced in an early stage of shifting, the additional torque generated by the change of the vehicle inertia raises shift shock. That is, if the vehicle speed changes while upshifting, the additional torque is generated by the change of the vehicle speed and the shift begins in a state in which the off-going element is not completely released or the on-coming element is not completely engaged. Therefore, shift shock similar to a tie-up may occur.

As shown in FIG. 3, when an upshift is performed while the vehicle runs downhill, the vehicle speed increases and thus positive additional torque is generated by a change of vehicle inertia. Therefore, the total additional torque calculated by adding the additional torque generated by the change of the engine inertia to the additional torque generated by the change of the vehicle inertia is generated, and thus shift shock may be raised.

As described above, in a case in which the vehicle speed changes during an upshift, torque may change by the change of the vehicle inertia. Therefore, shift shock may occur. There is therefore a need for an apparatus and a method for reducing shift shock that occurs because of the change of the vehicle speed. Exemplary apparatus and methods will now be described.

Figure 4:
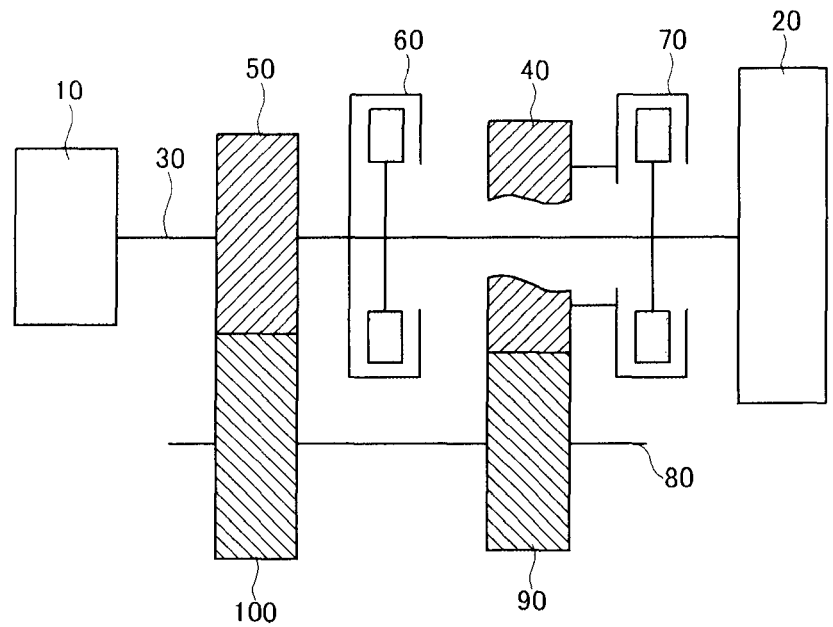
FIG. 4 is a schematic diagram of an automatic transmission according to an exemplary embodiment of the present invention.

FIG. 4 is a schematic diagram of an automatic transmission to which an upshift control method according to an exemplary embodiment of the present invention is provided. The automatic transmission receives torque from an input shaft 30 connected to an engine 10 and transmits the torque to an output shaft 80. In addition, at least one planetary gear set is interposed between the input shaft 30 and the output shaft 80 such that a rotation speed of the input shaft 30 is changed into a target rotation speed which is transmitted to the output shaft 80. Further, at least one frictional element that selectively connects an operational members of the planetary gear set to the input shaft 30, to a transmission case (not shown), or to another operational member, is disposed in the automatic transmission. For ease of description, only first and second drive gears 40 and 50, first and second driven gears 90 and 100, an on-coming element 60, and an off-going element 70 are shown in FIG. 4.

The first drive gear 40 is disposed on the input shaft 30 and achieves a first speed by operation of the off-going element 70. The first drive gear 40 is engaged with the first driven gear 90.

The second drive gear 50 is also disposed on the input shaft 30, and achieves a second speed by operation of the on-coming element 60. The second drive gear 50 is engaged with the second driven gear 100.

When the off-going element 70 is operated, the first speed is attained, and when the on-coming element 60 is operated, the second speed is attained. Therefore, a shift from the first speed to the second speed is achieved by releasing the off-going element 70 and simultaneously engaging the on-coming element 60.

In addition, vehicle inertia, schematically illustrated at reference numeral 20, is input to the input shaft 30.

Figure 5:
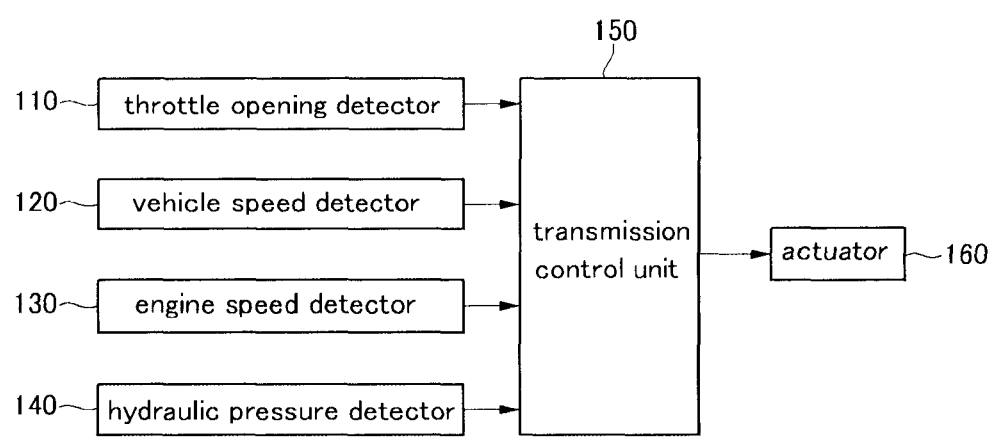
FIG. 5 is a block diagram of an upshift control system of an automatic transmission according to an exemplary embodiment of the present invention.

Turning to FIG. 5, an upshift control system of an automatic transmission according to an exemplary embodiment of the present invention includes a throttle opening detector 110, which detects a throttle opening (operated in accordance with the accelerator pedal. The system also includes a vehicle speed detector 120, which detects a vehicle speed, and an engine speed detector 130, which detects an engine speed by means of rotational speed of a crankshaft that rotates according to operation of the engine 10. The system also includes a hydraulic pressure detector 140, which detects hydraulic pressures applied to the off-going and on-coming elements. Each detector transmits a signal corresponding to its measurement to the transmission control unit 150.

The transmission control unit 150 may include one or more processors activated by a program that performs an upshift control method according to an embodiment of this invention. The transmission control unit 150 may further include a memory and associated hardware, software, and/or firmware that may be selected and programmed by a person of ordinary skill in the art based on the teachings herein.

The transmission control unit 150 determines whether a predetermined shift condition is satisfied by means of the vehicle speed and the throttle opening. In addition, the transmission control unit 150 calculates a modified hydraulic pressure according to a change of a vehicle speed when the vehicle speed changes during an upshift, and calculates a final hydraulic pressure by adding the modified hydraulic pressure to a reference hydraulic pressure. After that, the transmission control unit 150 transmits a control signal corresponding to the final hydraulic pressure to the actuator 160.

The actuator 160 receives the control signal from the transmission control unit 150 and controls hydraulic pressure applied to the on-coming element 60 and the off-going element 70. The actuator 160 may include control valves and/or solenoid valves that control the hydraulic pressure.

Figure 6:
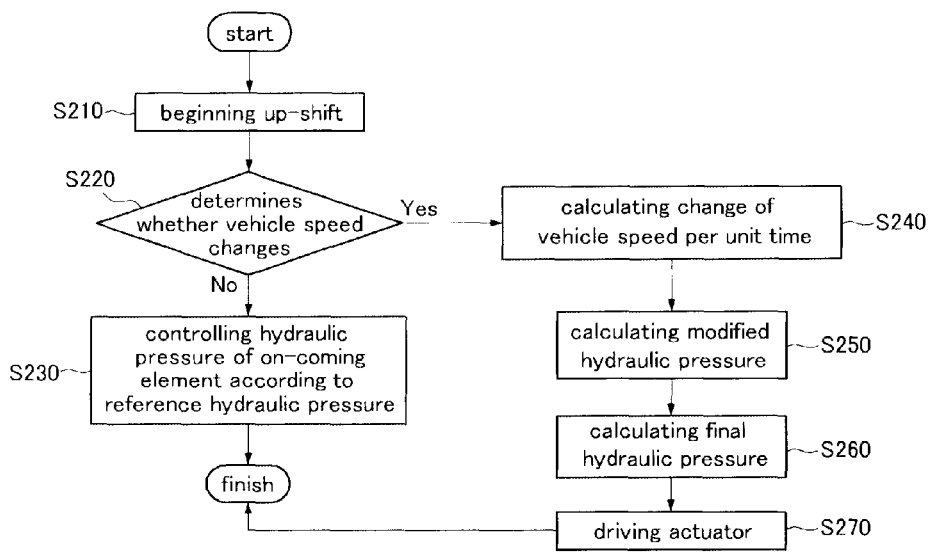
FIG. 6 is a flowchart showing an upshift control method of an automatic transmission according to an exemplary embodiment of the present invention.

Referring to FIG. 6, in a driving state of a vehicle, the transmission control unit 150 receives the throttle opening and the vehicle speed from the throttle opening detector 110 and the vehicle speed detector 120, and determines whether an upshift condition is satisfied. If the condition is satisfied, the transmission control unit 150 drives the actuator 160 to begin the upshift at step S210. The upshift condition is stored in a memory of the transmission control unit 150 and may be selected by a person of ordinary skill in the art based on the teachings herein.

During the upshift, the transmission control unit 150 determines whether the vehicle speed, detected by the vehicle speed detector 120, changes at step S220.

If the vehicle speed does not change at step S220, the transmission control unit 150 drives the actuator 160 according to a conventional upshift control method at step S230. That is, the transmission control unit 150 controls hydraulic pressure of the on-coming element 60 according to a reference hydraulic pressure stored in the memory. In addition, an engine torque reduction control may be performed by the transmission control unit 150 and an engine control unit (not shown).

If the vehicle speed changes at step S220, the transmission control unit 150 calculates the rate of change of the vehicle speed at step S240.

After that, the transmission control unit 150 calculates the modified hydraulic pressure based on the change of the vehicle speed at step S250.

The modified hydraulic pressure $$P_{a,i} = \frac{F}{A},$$

where, F is force applied to a frictional element by additional torque, and A is the cross-sectional area of the frictional element.

F may be calculated from $$F = \frac{\tau_{v,i}}{r},$$

where $\tau_{v,i}$ is the additional torque generated by the change of the vehicle speed, and r is the radius of the frictional element.

$\tau_{v,i}$ may be calculated from $$\tau_{v,i} = I_v \frac{\Delta v}{\Delta t},$$

where $I_v$ is vehicle inertia, and $$\frac{\Delta v}{\Delta t}$$

is the rate of change of the vehicle speed. Therefore, $$P_{a,i} = \frac{I_v}{rA} \cdot \frac{\Delta v}{\Delta t}.$$

After the modified hydraulic pressure $P_{a,i}$ according to the change of the vehicle speed is calculated, the transmission control unit 150 calculates the final hydraulic pressure $P_a$ at step S260. The final hydraulic pressure $P_a = P_r + P_{a,i}$, where $P_r$ is the reference hydraulic pressure stored in the memory of the transmission control unit 150. $P_r$ can be selected by a person skilled in the art based on the teachings herein.

Figure 7:
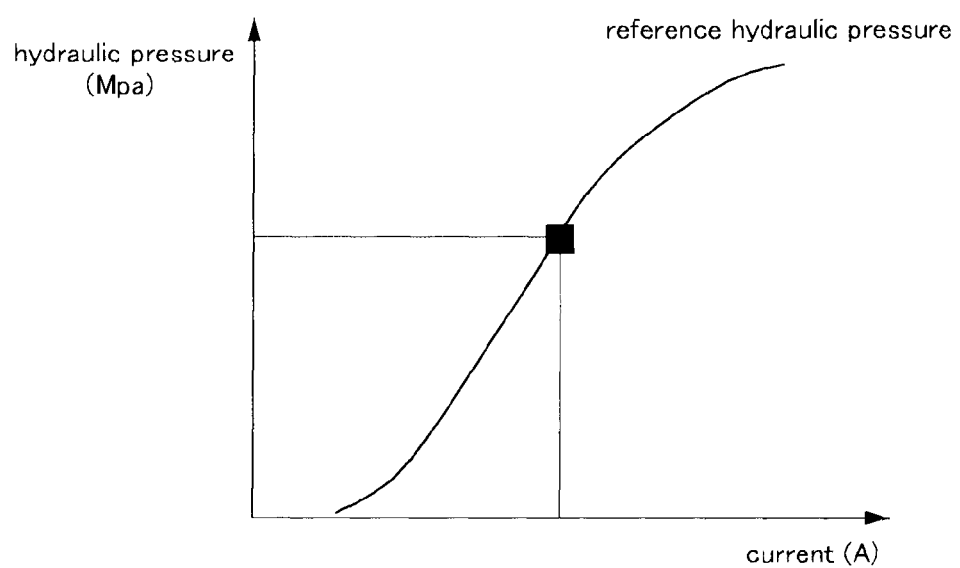
FIG. 7 is a graph showing a relationship between hydraulic pressure and solenoid current.

After that, the transmission control unit 150 transmits the control signal corresponding to the final hydraulic pressure $P_a$ to the actuator 160. Referring to FIG. 7, the control signal corresponds to the final hydraulic pressure $P_a$. In the example shown in FIG. 7, the control signal is current applied to the solenoid.

After that, referring back to FIG. 6, the actuator 160 controls hydraulic pressure applied to the frictional element based on the control signal at step S270.

Figure 8:
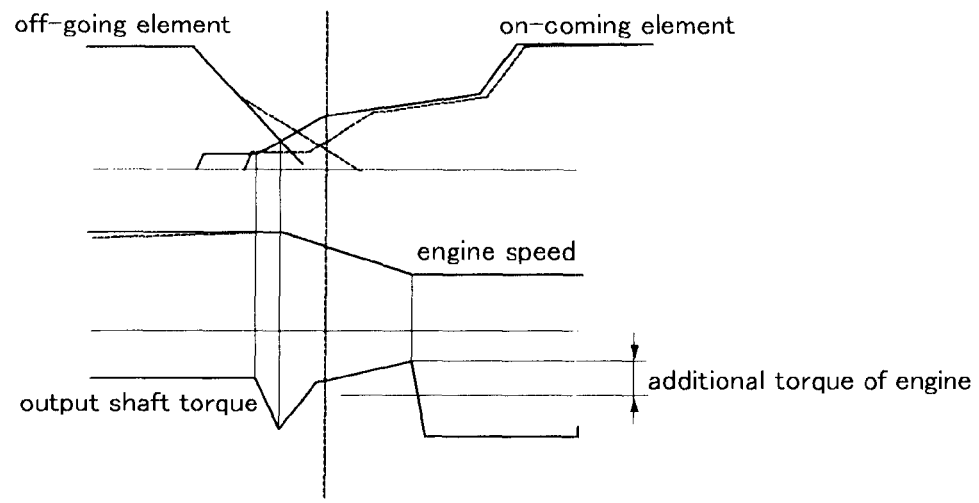
FIG. 8 is a control diagram showing an occurrence of additional torque when an upshift is performed according to an upshift control method while a vehicle runs uphill according to an exemplary embodiment of the present invention.
Figure 9:
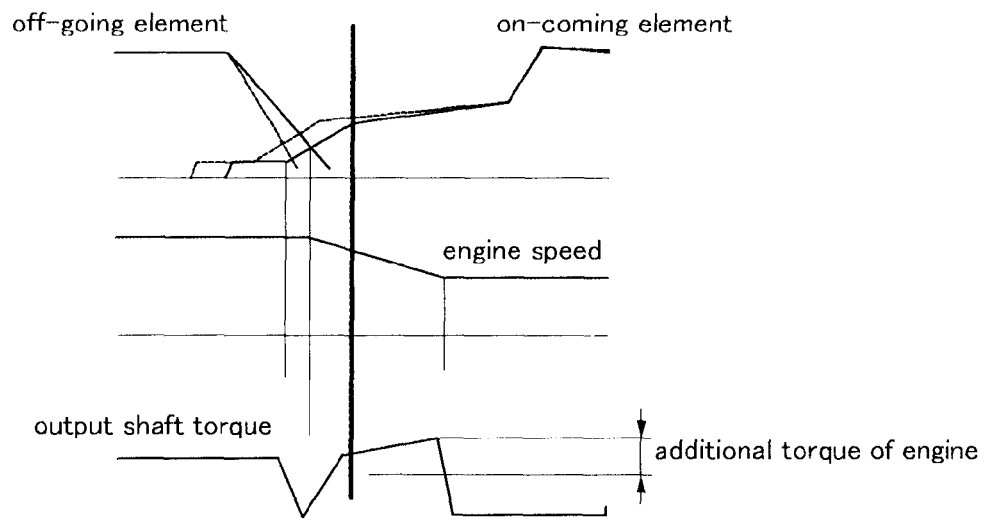
FIG. 9 is a control diagram showing an occurrence of additional torque when an upshift is performed according to an upshift control method while a vehicle runs downhill according to an exemplary embodiment of the present invention.

FIG. 8 is a control diagram showing an occurrence of additional torque when an upshift is performed according to an upshift control method of this invention while a vehicle runs on an uphill road, and FIG. 9 is a control diagram showing an occurrence of additional torque when an upshift is performed according to an upshift control method of this invention while a vehicle runs on a downhill road.

The solid line in FIG. 8 and FIG. 9 shows the reference hydraulic pressure applied to the frictional element, and the dotted line shows the final hydraulic pressure applied to the frictional element.

As shown in FIG. 8, when the vehicle speed decreases during upshift, the additional torque generated by the change of the vehicle speed is negative and thus supply of hydraulic pressure to the on-coming element must be delayed. Therefore, the transmission control unit 150 lowers hydraulic pressure supplied to the on-coming element at an early stage of shifting. Comparing the output shaft torque in FIG. 8 with the output shaft torque in FIG. 2, shift shock is reduced.

As shown in FIG. 9, when the vehicle speed increases during upshift, the additional torque generated by the change of the vehicle speed is positive and thus supply of hydraulic pressure to the on-coming element must be advanced. Therefore, the transmission control unit 150 increases hydraulic pressure supplied to the on-coming element at the early stage of shifting. Comparing the output shaft torque in FIG. 9 with the output shaft torque in FIG. 3, shift shock is reduced.

According to the present invention, when a vehicle speed changes and additional torque is generated during an upshift, hydraulic pressure supplied to an on-coming element is controlled according to a change of the vehicle speed, reducing shift shock.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An upshift control system of an automatic transmission, comprising:
   a vehicle speed detector for detecting a vehicle speed and outputting a signal corresponding thereto;
   a transmission control unit for receiving the signal, calculating a target hydraulic pressure based on a change of the vehicle speed, and outputting a control signal corresponding to the target hydraulic pressure; and
   an actuator for controlling an actual hydraulic pressure of an on-coming element based on the control signal.

2. The upshift control system of claim 1, wherein the target hydraulic pressure is calculated by adding a modified hydraulic pressure, calculated based on the change of the vehicle speed, to a constant reference hydraulic pressure.

3. The upshift control system of claim 2, wherein the modified hydraulic pressure is proportional to a rate of change of the vehicle speed.

4. An upshift control method of an automatic transmission, comprising:
   determining whether a vehicle speed changes during an upshift;
   calculating a change of the vehicle speed if the vehicle speed changes;
   calculating a target hydraulic pressure based on the change of the vehicle speed; and
   controlling an actual hydraulic pressure of an on-coming element based on the target hydraulic pressure.

5. The upshift control method of claim 4, wherein the target hydraulic pressure comprises a modified hydraulic pressure that is proportional to a rate of change of the vehicle speed.

6. The upshift control method of claim 5, wherein the target hydraulic pressure comprises the modified hydraulic pressure added to a constant reference hydraulic pressure.

7. The upshift control method of claim 6, wherein the actual hydraulic pressure is controlled according to the reference hydraulic pressure if the vehicle speed does not change.

* * * * *